United States Patent [19]

O'Donnell et al.

[11] Patent Number: 5,304,346
[45] Date of Patent: Apr. 19, 1994

[54] WELDING MATERIAL FOR LOW COEFFICIENT OF THERMAL EXPANSION ALLOYS

[75] Inventors: David B. O'Donnell; Robert A. Bishel, both of Huntington, W. Va.

[73] Assignee: INCO Alloys International, Inc., Huntington, W. Va.

[21] Appl. No.: 965,514

[22] Filed: Oct. 23, 1992

Related U.S. Application Data

[63] Continuation of Ser. No. 773,234, Oct. 9, 1991, abandoned, which is a continuation-in-part of Ser. No. 645,822, Jan. 25, 1991, abandoned, which is a continuation-in-part of Ser. No. 604,578, Oct. 26, 1990, abandoned.

[51] Int. Cl.$^5$ ............................................. C22C 38/08
[52] U.S. Cl. ..................................... 420/580; 420/94; 420/95; 420/459; 420/581; 148/310; 148/312; 148/336; 148/426; 148/23; 148/24; 148/26
[58] Field of Search ............... 420/580, 581, 582, 583, 420/584, 585, 586, 94, 95, 459; 148/23, 24, 26, 310, 312, 336, 426

[56] References Cited

U.S. PATENT DOCUMENTS

| | | | |
|---|---|---|---|
| 3,940,295 | 2/1976 | Lupton et al. | 148/336 |
| 3,971,677 | 7/1976 | Mason et al. | 148/31 |
| 4,066,447 | 1/1978 | Smith, Jr. et al. | 420/95 |
| 4,087,673 | 5/1978 | Kiilunen | 148/26 |
| 4,205,218 | 5/1980 | Fukami et al. | 148/26 |
| 4,394,560 | 7/1983 | Kishida et al. | 420/94 |
| 4,913,752 | 4/1990 | Falk | 148/336 |

FOREIGN PATENT DOCUMENTS

| | | |
|---|---|---|
| 1957944 | 5/1971 | Fed. Rep. of Germany . |
| 2095416 | 2/1972 | France ........................ 219/146.23 |

Primary Examiner—W. Bean
Assistant Examiner—Sikyin Ip
Attorney, Agent, or Firm—Blake T. Biederman; Edward A. Steen

[57] ABSTRACT

The invention provides a welding material for welding iron containing low CTE alloys. The filler metal contains 25-55% nickel, 0-30% cobalt, 0.05-0.5% carbon, 0.25-5% niobium and balance iron with incidental impurities. The welding material also is operable with fluxes for submerged arc welding. In addition, the welding material may be configured to function as a flux coated or flux-cored electrode.

13 Claims, No Drawings

WELDING MATERIAL FOR LOW COEFFICIENT OF THERMAL EXPANSION ALLOYS

This is a continuation application of Ser. No. 07/773,234, filed Oct. 9, 1991 abandoned which was is a continuation-in-part of copending application Ser. No. 07/645,822 filed on Jan. 25, 1991, now abandoned. Application Ser. No. 07/645,822 is a continuation-in-part of copending application Ser. No. 07/604,578 filed Oct. 26, 1990, now abandoned.

TECHNICAL FIELD

This invention relates to welding of low coefficient of thermal expansion alloys. In particular, this invention relates to welding material for welding iron-containing low expansion alloys with or without flux.

BACKGROUND OF THE INVENTION

Historically a combination of iron and nickel or cobalt has been used to produce low coefficient of thermal expansion (CTE) alloys. Invar 36 (36 Ni, balance Fe), Invar 42 (42 Ni, balance Fe) and Kovar (29 Ni, 17 Co, 0.2 Mn balance Fe) are common low coefficient of thermal expansion alloys. Welding of iron containing low CTE alloys requires a weld with adequate ductility and strength. In addition, for fabrication of welded low CTE alloys it is desired to use a filler metal with a CTE closely matched to the base metal to limit thermal deflections and strain.

Without further modification, low CTE base metals may be easily drawn into filler metal wire. However, base metal filler metal is highly subject to cracking resulting from impurities and a relatively large solidification range of about 80° Celsius. Witherell, in U.S. Pat. No. 3,184,577 ('577), disclosed a filler metal specifically designed for welding Invar. A combination of titanium, carbon and manganese was used in the '577 patent to control cracking during welding operations. Commercially, filler metal of the '577 patent has been used for welding Invar 36 with undesirable limitations. Filler metal disclosed in the '577 patent cracks extensively when welding relatively thick sections of Invar. In addition, filler metal of the '577 patent has been limited to relatively slow gas tungsten arc welding (GTAW), because cracking is excessive when welding with gas metal arc welding (GMAW). GMAW is significantly quicker than GTAW and is generally preferred for high volume fabrication. Furthermore, multiple pass welding with Witherell's filler metal has caused excessive crack growth problems.

In addition, submerged arc welding (SAW) may be used to further increase welding rates. Submerged arc welding operability of a filler metal is another highly advantageous property. Furthermore, flux coated electrodes are useful for out of position welding where it is difficult to weld by GTAW, GMAW or SAW.

It is an object of this invention to produce a welding material having a coefficient of thermal expansion that matches the base metal with sufficient strength and ductility.

It is a further object of this invention to produce a filler metal capable of welding relatively thick sections of Invar without cracking.

It is a further object of this invention to provide a filler metal that may be gas metal arc welded without cracking.

It is a further object to produce a welding material that may be used in multiple pass type welding operations without cracking.

It is a further object of the invention to produce a weld wire that may be submerged arc welded.

SUMMARY OF THE INVENTION

The welding material of the invention may be used for GMAW relatively thick sections of low CTE alloys. In fact, multiple pass GMAW may be used without cracking. Furthermore, the welding material of the invention facilitates rapid submerged arc welding and may be flux coated for facilitating out of position welding. The broad range of the invention preferably includes about 10–80% nickel, about 0 to 80% cobalt (used as a nickel substitute), about 0.05 to 0.5% carbon, about 0.25–5% welding agent selected from the group consisting of niobium and tantalum with a balance of iron. In addition, the alloy may contain about 0–3% manganese, about 0–3% titanium and about 0–1% aluminum. Preferably Mg or Ce is used during melting to tie up sulfur which tends to promote crack formation. Most preferably, Mg is used in an amount greater than the amount of sulfur. Impurities are preferably limited to less than about 0.1% sulfur, less than about 0.1% phosphorous and less than about 1% silicon.

Most preferably, the welding material includes about 25–55% nickel, about 0–30% cobalt, about 0.05–0.35% carbon, about 0.5–3% niobium plus tantalum and a balance iron with incidental impurities. Furthermore, filler metal is preferably limited to about 0–1.5% manganese, about 0–2% titanium and about 0–0.5% aluminum. In addition, about 0–0.5% cerium, magnesium or zirconium is preferably used for tying up sulfur. Furthermore, it may be most advantageous to limit cerium, magnesium or zirconium to less than 0.1%. In addition, impurities are preferably limited to about 0.05% sulfur, about 0.05% phosphorous and about 0.5% silicon.

DESCRIPTION OF PREFERRED EMBODIMENT

Several experimental heats were tested to find a combination of ingredients that may be added to low CTE alloys without cracking during multiple pass GMAW.

Composition of typical experimental heats tested are listed below in Table 1 as heats numbers 1–14 (all compositions of this specification are given in weight percent, unless specifically expressed otherwise). Heat number 15 was a sample of Invar 36. Heat number 16 was added to verify a filler metal essentially free of calcium, copper, magnesium and manganese would operate effectively.

TABLE 1

| Heat No. | C | Mn | S | Si | Cu | Ni | Ti | Nb | Mg | Ca | P |
|---|---|---|---|---|---|---|---|---|---|---|---|
| 1 | .068 | .71 | .005 | .010 | .48 | 35.47 | .009 | .007 | .002 | .000 | .003 |
| 2 | .105 | .71 | .006 | .015 | .50 | 35.55 | .000 | 1.12 | .003 | .000 | .004 |
| 3 | .120 | .72 | .004 | .053 | .49 | 35.37 | .000 | 1.13 | .000 | .012 | .004 |
| 4 | .107 | .71 | .005 | .076 | .50 | 35.59 | .78 | .054 | .000 | .017 | .003 |
| 5 | .21 | .72 | .005 | .066 | .49 | 34.89 | 1.10 | .003 | .000 | .012 | .003 |
| 6 | .21 | .71 | .009 | .058 | .49 | 35.07 | .037 | .002 | .000 | .017 | .003 |
| 7 | .198 | .72 | .009 | .015 | .50 | 34.97 | .000 | .001 | .003 | .000 | .003 |

TABLE 1-continued

| Heat No. | C | Mn | S | Si | Cu | Ni | Ti | Nb | Mg | Ca | P |
|---|---|---|---|---|---|---|---|---|---|---|---|
| 8 | .22 | .72 | .007 | .017 | .50 | 35.22 | .000 | 1.87 | .004 | .000 | .004 |
| 9 | .129 | .73 | .007 | .065 | .024 | 35.75 | .000 | 1.15 | .000 | .017 | .004 |
| 10 | .126 | .72 | .006 | .066 | .96 | 35.47 | .000 | 1.13 | .000 | .017 | .004 |
| 11 | .128 | .70 | .005 | .065 | 1.85 | 35.09 | .000 | 1.14 | .000 | .016 | .004 |
| 12 | .136 | .73 | .007 | .080 | 3.81 | 34.34 | .000 | 1.14 | .000 | .022 | .004 |
| 13 | .163 | .86 | .008 | 0 | 0.022 | 40.48 | .171 | 1.76 | .004 | .000 | .005 |
| 14 | .208 | .73 | .008 | .037 | 0.036 | 35.24 | .143 | 1.62 | .007 | .000 | .005 |
| 15 | .013 | .33 | .007 | .000 | .000 | 36.36 | .027 | .006 | .004 | .000 | .003 |
| 16 | .189 | .00 | .004 | .025 | .007 | 35.91 | .36 | 2.00 | .000 | .001 | .001 |

The heats of Table 1 were tested for solidification range (values in Table 1 have been rounded to the nearest one thousandth of a weight percent to reflect accuracy of instrumentation used).

Test results are given below in Table 2.

TABLE 2

| HEAT | LIQUIDOUS °C. | SOLIDUS °C. | DIFFERENCE °C. |
|---|---|---|---|
| 1 | 1471 | 1452 | 19 |
| 2 | 1466 | 1425 | 41 |
| 3 | 1467 | 1426 | 41 |
| 4 | 1467 | 1428 | 39 |
| 5 | 1462 | 1423 | 39 |
| 6 | 1468 | 1450 | 18 |
| 7 | 1470 | 1451 | 19 |
| 8 | 1462 | 1418 | 44 |
| 9 | 1469 | 1429 | 40 |
| 10 | 1465 | 1425 | 40 |
| 11 | 1462 | 1425 | 37 |
| 12 | 1451 | 1407 | 44 |
| 13 | 1468 | 1381 | 87 |

The difference between liquidous and solidous temperatures of the test heats (18°–44° C.) was much improved over Invar 36 (heat 15) which may have a temperature differential of at least 80° C. as measured between liquidous and incipient solidous. This decreased solidification range contributes to reducing cracking during solidification.

Heat numbers 1–12 were gas tungsten arc spot welded at 420 amp and 22 volts for 10 seconds in a single spot weld without changing position. This 420 amp, 22 volt operation greatly exceeded minimum required energy to weld. The excess energy applied additional stress to the weld for evaluation under severe welding conditions. As a result of this 10 second test, only heat numbers 9 and 12 cracked. Heat number 9 had a total crack length of 0.60 cm and heat number 12 had a total crack length of 0.60 cm.

A more severe 20 second gas tungsten arc spot weld at 420 amp and 22 volts was then used to determine which filler metal compositions had the best cracking resistance. Results of total crack length for two separate tests are given below in Table 3.

TABLE 3

| HEAT | TEST A TOTAL CRACK LENGTH (cm) | TEST B TOTAL CRACK LENGTH (cm) | TOTAL (cm) |
|---|---|---|---|
| 1 | 6.2 | 5.5 | 11.7 |
| 2 | 0 | 0 | 0 |
| 3 | 3.0 | 2.4 | 5.4 |
| 4 | 6.0 | 7.9 | 13.9 |
| 5 | 1.5 | 0.5 | 2.0 |
| 6 | 6.9 | 1.5 | 8.4 |
| 7 | 0 | 0 | 0 |
| 8 | 0 | 0 | 0 |
| 9 | 6.2 | 6.4 | 12.6 |
| 10 | 2.4 | 2.8 | 5.2 |
| 11 | 6.3 | 7.8 | 14.1 |
| 12 | 5.4 | 4.1 | 9.5 |

TABLE 3-continued

| HEAT | TEST A TOTAL CRACK LENGTH (cm) | TEST B TOTAL CRACK LENGTH (cm) | TOTAL (cm) |
|---|---|---|---|
| 16 | 0 | 0 | 0 |

Heat numbers 2, 7, 8 and 16 produced the best results having no cracks. The combination of carbon and niobium of heats 2, 8 and 16 was found to have the most preferred cracking resistance properties. For purposes of this specification, it is recognized that niobium and tantalum are interchangeable and that niobium or tantalum may be used independently or in combination for welding materials of the invention.

A cruciform or X-joint welding test at 420 amp and 22 volts was then used to test filler metals under more rigorous welding conditions. All tests were 9.5 cm in length. Test results are given below in Table 4.

TABLE 4

| HEAT | TEST A TOTAL CRACK LENGTH (cm) | TEST B TOTAL CRACK LENGTH (cm) | TEST C TOTAL CRACK LENGTH (cm) | TOTAL (cm) |
|---|---|---|---|---|
| 1 | 1.1 | 1.4 | 4.4 | 6.9 |
| 2 | 0.4 | 0 | 0 | 0.4 |
| 3 | 0.4 | 0.6 | 0.7 | 1.7 |
| 4 | 0.4 | 1.1 | 1.4 | 2.9 |
| 5 | 0.4 | 0 | 0 | 0.4 |
| 6 | 2.0 | 1.8 | 5 | 8.8 |
| 7 | 7.5 | 3.8 | 3.9 | 15.2 |
| 8 | 0.1 | 0 | 0 | 0.1 |
| 9 | 0 | 1.3 | 0.4 | 1.7 |
| 10 | 0.8 | 0.8 | 0.6 | 2.2 |
| 11 | 1.0 | 0.8 | 0.6 | 2.2 |
| 12 | 0.6 | 0.8 | 1.1 | 2.5 |
| 16 | 0 | 0 | 0 | 0 |

Again heat numbers 8 and 16 gave the best results with heat numbers 2 and 5 being the next best.

Welds produced at 415 amps and 22 V were tested for physical properties. A bend test was used to measure propensity to crack during bending or ductility. Impact tests were used to determine strength in as welded condition and strength after a 1.5 hour heat treatment in an inert 790° C. atmosphere. Test results are given below in Table 5.

TABLE 5

| HEAT | BEND TOTAL CRACK LENGTH (cm) | IMPACT STRENGTH AS WELDED (JOULES) | IMPACT STRENGTH HEAT TREATED AT 750° C. FOR 1.5 HOURS (JOULES) |
|---|---|---|---|
| 1 | X, 0.3 | 98 149 81 | — |
| 2 | 0, 0.08 | 56 54 | 68 76 |
| 3 | 0, 0.08 | 87 94 81 | 82 77 83 |
| 4 | 0, 0 | 60 50 66 | 55 49 61 |
| 5 | 0, 0 | 27 26 30 | 26 24 23 |

TABLE 5-continued

| HEAT | BEND TOTAL CRACK LENGTH (cm) | IMPACT STRENGTH AS WELDED (JOULES) | IMPACT STRENGTH HEAT TREATED AT 750° C. FOR 1.5 HOURS (JOULES) |
|---|---|---|---|
| 6 | 0.5, 1.8 | 58 79 45 | 60 37 58 |
| 7 | X, 0.08 | 68 77 89 | 41 76 89 |
| 8 | 0, 0 | 34 41 37 | 33 38 35 |
| 9 | 0, 0 | 71 74 72 | 66 74 |
| 10 | 0, 0 | 70 74 72 | 81 77 73 |
| 11 | 0, 0 | 61 65 68 | 68 62 |
| 12 | 0, 0 | 62 64 72 | 69 64 |
| 16 | 0, 0 | 24 27 29 | — |

X designates welded failure

The test data indicate that heat numbers 2, 8 and 16 rich in carbon and niobium had physical properties acceptable for an Invar 36 weld. Niobium has been found to increase cracking resistance and decrease impact strength. The upper limit of niobium in the filler metal is essentially limited by the amount of acceptable reduction in impact strength. Heat number 5, which relied upon carbon and titanium had about one half of the impact strength of welds produced using carbon and relatively low amounts of niobium (about 1.1%). Furthermore, during intermediate anneals, which are often used in drawing weld wire to final size, titanium has a much greater tendency to oxidize than niobium. Titanium tends to form surface oxides during annealing which increase die wear. Predicted CTE of the filler metals tested were calculated to be very close to the base metal. It is preferred to add more magnesium or cerium than sulfur to ensure tying up of sulfur and prevent sulfur rich films. An addition of up to 0.5% Mg, Zr or Ce is preferred to limit negative effects of sulfur inclusions.

Heat numbers 13 and 14 were tested for coefficient of thermal expansion (CTE) in accordance with ASTM E228. To match CTE, preferably the ratio of nickel, iron and cobalt approximates the ratio of nickel, iron and cobalt in the base metal to be welded. Advantageously, weight percent of nickel, iron and cobalt is within 10 percent of the base metal weight percent. For example, a welding material for an alloy having 36 weight percent nickel would have a weight percentage nickel of about 32.4 to 39.6. Most advantageously, nickel, cobalt and iron are each within about 2 weight percent of the base metal. Heat 13 compared favorably to Invar 42. In addition, when welding iron-nickel low coefficient of thermal expansion alloy systems that do not contain cobalt, it is most advantageous not to substitute cobalt for nickel in the welding material. Invar 42 has a maximum CTE of 4.7 cm/cm/°C. $\times 10^{-6}$ at 300° C. and a maximum CTE of 7.4 cm/cm/°C. $\times 10^{-6}$ at 450° C. Heat number 13 measured 5.07 cm/cm/°C.$\times 10^{-6}$ at 300° C. and 8.33 cm/cm/°C.$\times 10^{-6}$ at 450° C. The proximity of these values to specified values for Invar 42 specification would result in minimal stress from thermal cycling.

Heat number 14 (Invar 36 filler metal), also was found to have a close CTE to maximum Invar 36 specifications. Table 6 below compares heat number 14 to base metal maximum values and to CTE data extrapolated from FIG. 2 of Witherell's U.S. Pat. No. 3,184,577 ('577).

TABLE 6

| | COEFFICIENT OF THERMAL EXPANSION (cm/cm/°C. $\times 10^{-6}$) | | |
|---|---|---|---|
| TEMPERATURE °C. | INVAR 36 (MAX.) | HEAT NO. 14 | WITHERELL U.S. Pat. No. 3,184,577 |
| 93 | 2.0 | 2.3 | 2.8 |
| 149 | 2.5 | 2.8 | 5.4 |
| 260 | 4.9 | 5.9 | 12.2 |
| 371 | 7.9 | 8.9 | 16.7 |

As shown in Table 6, CTE for heat number 14 compares favorably to base metal Invar 36 and is significantly improved over the '577 patent.

Welding material of the invention is advantageously within the following ranges expressed in Table 7.

TABLE 7

| | BROAD | NARROW |
|---|---|---|
| Nickel | 10–80 | 25–55 |
| Cobalt | 0–80 | 0–30 |
| Carbon | 0.05–0.5 | 0.05–0.35 |
| Niobium and/or Tantalum | 0.25–5 | 0.5–3 |
| Manganese | 0–3 | 0–1.5 |
| Titanium | 0–3 | 0–2 |
| Aluminum | 0–1 | 0–0.5 |
| Copper | 0–5 | 0–2 |
| Magnesium | 0–0.5 | 0–0.1 |
| Cerium | 0–0.5 | 0–0.1 |
| Zirconium | 0–0.5 | 0–0.1 |
| Sulfur | 0–0.1 | 0–0.05 |
| Silicon | 0–1 | 0–0.5 |
| Phosphourous | 0–0.1 | 0–0.05 |
| Iron | Balance | Balance |

Nickel, iron and cobalt ranges are advantageously adjusted to amounts approximate to nickel iron and cobalt amounts contained in low coefficient of thermal expansion base metals to be welded. Most advantageously, nickel, iron and cobalt are further adjusted to achieve a matched CTE. The most advantageous range for Invar-type filler metals is 30 to 50% nickel, 0.05 to 0.35% carbon, 0.5 to 3% niobium, 0 to 1.5% manganese, 0 to 2% titanium, 0 to 0.1% magnesium with an iron balance.

A welding material of the invention was tested for submerged arc welding. Filler metal of heat numbers 13 and 14 was combined with Incoflux ® 6 submerged arc flux (Incoflux is a registered trademark of the Inco family of companies). Incoflux 6 submerged arc flux has the following compositions:

| Ingredient | Weight Percent |
|---|---|
| $Al_2O_3$ | 15–40 |
| $CaF_2$ | 40–70 |
| MgO | 3–7 |
| Ni | 1–5 |
| $K_2SiO_3$ | 1–5 |
| $Na_3AlF_6$ | 3–7 |
| $TiO_2$ | 3–7 |

Bare filler metals of this invention, for Invar 36 and 42, have operated unexpectedly well. For example, a 0.11 cm diameter Invar 36 filler metal successfully operated at 325–350 amps, at 32 volts and 15.9 m/s. Typically, operating parameters for filler metals used in submerged arc welding of nickel-base alloys are limited to 240–250 amps and slower feed rates. The great resistance to cracking and porosity of the filler metal allows welding operations at increased rates.

Welding material of the invention have also been successfully used as a core wire for a coated electrode. Advantageously, flux of the invention contains metal carbonate selected from the group consisting of calcium carbonate, barium carbonate, manganese carbonate and strontium carbonate for control of flux solidification. It has been found to be advantageous to add coarse calcium carbonate (74 to 420 microns) to the flux for preferred drying properties. Cryolite, Tri-Manox ® brand brown manganese oxide ($Mn_3O_4$ 80%, $SiO_2$ 5%, Fe 10%) and/or alkaline metal fluoride selected from the group consisting of $CaF_2$, $BaF_2$ and $SrF_2$ may be used for increasing fluidity. Advantageously, magnetite is used to let silicon pick up in the weld deposit. Rutile and/or zirconia may be used as filler. In addition, rutile and other titanium-containing compounds such as NiTi and FeTi may be used to limit porosity formed from nitrogen. Natrosol ® brand hydroxyethycellulose (HEC) is advantageously added as an extrusion aid and to provide green strength. Bentonite is advantageously added to provide strength after baking. Flux coated weld rods of the invention contained a total of 30 weight percent flux and binder after baking. And finally, any binder such as water glass may be used to hold the flux to the weld rod. Binder specifically used was a liquid having manufacturer's specification of 31.3–32.5% $SiO_2$, 10.5–11.5% $Na_2O$ and 2.83–2.98% $SiO_2+Na_2O$, having a viscosity at 20° C. of 780–1140 centipoise and a specific gravity at 20° C. of about 1.59–1.67 g/cm$^3$.

Advantageously, niobium and carbon compounds are added to maintain sufficient niobium and carbon content in the weld deposit. Most advantageously, a combination of NiNb, FeNb, (Ni, C) and (Fe, C) is added in a proportion that maintains niobium levels and carbon levels. In addition, NiTi and/or FeTi may be added to the flux to control porosity and to a lesser extent contribute nickel and iron to the weld deposit. Advantageously, nickel and iron components are controlled to match base metal weight percents. Desired ranges of the ingredients and compositions of two specific coated electrodes which successfully operated are provided below in Table 8.

It is recognized that the welding material of the invention may be welded in various welding configurations including bare filter metal GTAW, GMAW, SAW, coated electrode, flux-cored and other known configurations provided weld deposit composition is maintained. Weld deposit parameters are given below in Table 9.

TABLE 9

|  | BROAD | INTERMEDIATE | NARROW |
|---|---|---|---|
| C | 0.05–0.35 | 0.05–0.30 | 0.1–0.25 |
| Mn | 0–2.5 | 0–1.5 | 0–0.8 |
| Fe | Bal. | Bal. | Bal. |
| S | 0–0.05 | 0–0.02 | 0–0.01 |
| Si | 0–1 | 0–1 | 0–.75 |
| Cr | 0–2 | 0–1 | 0–0.5 |
| Al | 0–0.5 | 0–0.25 | 0–0.2 |
| Ti* | 0–0.75 | 0–0.5 | 0–0.4 |
| Nb | 0.1–4 | 0.5–3 | 1–2.5 |
| P | 0–0.05 | 0–0.02 | 0–0.01 |
| Mg | 0–0.1 | 0–0.1 | 0.0005–0.075 |
| Cu | 0–4 | 0–2 | 0–0.5 |
| Ag, B, Sn, Zn | 0–0.01 | 0–0.005 | 0–0.001 |
| Ni + Co | ±10* | ±5* | ±2* |
| Ni (Invar 36) | 31–40 | 33–38 | 34.25–36.75 |
| Ni (Invar 42) | 36–45 | 39–42 | 39.5–41.5 |

*Weight percent of nickel plus cobalt in relation to weight percent of nickel plus cobalt in low coefficient of thermal expansion base metal of nominal composition containing nickel and iron.

In conclusion, welding materials of the invention have been successfully produced that have a matched CTE, strength and ductility. Furthermore, alloys of the carbon and niobium combination has allowed welding of thick sections. GMAW of low CTE alloys and multiple pass welding without cracking. The present invention contemplates any range definable by any two specific ranges disclosed in the specification and any range definable between any specified values in the specification. For example, the invention contemplates weld deposits having 0.05 to 0.30 carbon and filler metal having 0.06–0.37 carbon.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

TABLE 8

|  | Broad | Intermediate | Specific Compositions | |
|---|---|---|---|---|
| Alkaline Metal Carbonate | 10–40 | 20–35 | 15 (CaCO$_3$) | 15 (CaCO$_3$) + 5 (SrCO$_3$) |
| Crolite | 0–45* | 0–35** | 25 | 25 |
| Alkaline Metal Fluoride | 0–40* | 0–30** |  |  |
| Rutile | 0–45 | 20–45 | 30 | 30 |
| Zirconia |  | 0–20 |  |  |
| Magnetite |  | 0–10 | 6 | 6 |
| Mn$_3$O$_4$ (80%), 5% SiO$_2$, 10% Fe |  | 0–15 | 5 |  |
| FeNb |  | 0–15 | 3 (65Nb, 34Fe, 1Al) | 3 (65Nb, 34Fe, 1Al) |
| Fe, C |  | 0–15 |  |  |
| NiNb |  | 0–15 |  |  |
| Ni, C |  | 0–15 | 1.5 (75 Ni, 25C) | 1.5 (75Ni, 25C) |
| FeTi |  | 0–15 |  |  |
| NiTi |  | 0–15 |  |  |
| Bentonite | 0–5 | 2–5 | 4 | 4 |
| Hydroxyethylcellulose | 0–4 | 0–2 | 0.5 | 0.5 |
| Binder |  | 0–4 | 20 (sodium silicate) | 20 (sodium silicate) |
| Water Cellulose or HEC |  |  | 1.25 | 1.25 |

*Cryolite plus Alkaline Metal Fluoride equals 5–45%
**Cryolite plus Alkaline Metal Fluoride equals 10–35%

The embodiments of the invention in which an exclusive property or privilege is claimed are defined as follows:

1. A welding material useful for welding iron containing low coefficient of thermal expansion alloys consisting essentially of by weight percent about 25-55% nickel, about 0-30% cobalt, at least 0.12% carbon to a maximum of 0.5% carbon, about 0.25-5% of niobium and tantalum, about 0-0.5% element selected from the group consisting of magnesium, zirconium and cerium, less than about 0.1% sulfur, less than about 1% silicon, less than about 0.1% phosphorous and balance iron with incidental impurities.

2. The welding material of claim 1 wherein said alloy contains 0.5-3% niobium.

3. The welding material of claim 1 including about 0-3% manganese, about 0-5% copper, about 0-3% titanium and about 0-1% aluminum.

4. The welding material of claim 1 including about 0.5-3% of niobium and tantalum, about 0-1.5% manganese, about 0-2% copper, about 0-1.5% titanium, about 0-0.5% aluminum, about 0-0.1% magnesium, about 0-0.1% cerium, about 0-0.1% zirconium, less than about 0.05% sulfur, less than about 0.5% silicon and less than 0.05% phosphorous.

5. The welding material of claim 1 wherein said welding material contains magnesium and weight percent of said magnesium is greater than weight percent sulfur contained in said welding material.

6. The welding material of claim 1 wherein said welding material contains about 0 to 0.1% magnesium.

7. The welding material of claim 1 wherein said welding material is coated with a flux.

8. The welding material of claim 7 wherein said flux consists essentially of about 10-40% alkaline metal carbonate, about 0-45% cryolite, about 0-40% alkaline metal fluoride, about 0-45% rutile, a binder and about 5-45% cryolite plus alkaline metal fluoride.

9. The welding material of claim 7 wherein said flux consists essentially of, by weight percent, about 20-35% alkaline metal carbonate, about 0-35% cryolite, about 0-30% alkaline metal fluoride, about 10-35% total cryolite plus alkaline metal fluoride, about 20-45% rutile, about 0-20% zirconia, about 0-10% magnetite, about 0-15% of 80% MnO-5% $SiO_2$-10% Fe weld agent, about 0-15% FeNb, about 0-15% Fe-C, about 0-15% NiNb, about 0-15% Ni-C, about 0-15% FeTi, about 2-5% bentonite, about 0-2% hydroxyethylcellulose and 0-4% binder.

10. A welding deposit useful for combining iron-containing low expansion alloys, said welding deposit as measured without dilution from a base metal consisting essentially of by weight percent about 31 to 45% nickel, at least above 0.1% carbon to a maximum of 0.35% carbon, about 0-2.5% manganese, about 0-0.1% magnesium, about 0.1-4% niobium plus tantalum, about 0 to 0.75% titanium, about 0 to 1% silicon, about 0 to 2% chromium, about 0 to 0.5% aluminum, about 0-4% copper, about 0 to 0.05% sulfur, about 0 to 0.05% phosphorous and less than about 0.01% ingredient selected from the group consisting of silver, boron, tin and zinc balance essentially iron for proving a low coefficient of thermal expansion weld despot.

11. The welding deposit of claim 10 wherein said deposit contains at least 0.12% carbon.

12. The welding deposit of claim 10 wherein said welding deposit includes about 0 to 1.5% manganese, about 0 to 0.02% sulfur, about 0.5 to 3% niobium plus tantalum, about 0 to 4% copper and about 0 to 0.5% titanium.

13. The weld deposit of claim 10 wherein said welding deposit includes a maximum of 0.25% carbon, 0 to 0.8% manganese, 0 to 0.01% sulfur, 0 to 0.75% silicon, 1 to 2.5% niobium plus tantalum, 0.0005-0.075% magnesium and 0 to 0.4% titanium.

* * * * *